(12) United States Patent
Jacobs

(10) Patent No.: US 10,962,157 B2
(45) Date of Patent: Mar. 30, 2021

(54) COUPLER

(71) Applicant: Cobalt Coupler Systems, LLC, Fort Collins, CO (US)

(72) Inventor: Jon Joseph Jacobs, Fort Collins, CO (US)

(73) Assignee: Cobalt Coupler Systems, LLC, Fort Collins, CO (US)

( * ) Notice: Subject to any disclaimer, the term of this patent is extended or adjusted under 35 U.S.C. 154(b) by 0 days.

(21) Appl. No.: 15/678,015

(22) Filed: Aug. 15, 2017

(65) Prior Publication Data

US 2018/0299053 A1 Oct. 18, 2018

Related U.S. Application Data

(63) Continuation-in-part of application No. 15/490,691, filed on Apr. 18, 2017.

(51) Int. Cl.
*F16L 37/091* (2006.01)

(52) U.S. Cl.
CPC ................... *F16L 37/091* (2013.01)

(58) Field of Classification Search
CPC ......... F16L 37/091; F16L 37/08; F16L 21/08; F16L 37/02
USPC ................... 285/45, 340, 369, 374
See application file for complete search history.

(56) References Cited

U.S. PATENT DOCUMENTS

| | | | |
|---|---|---|---|
| 1,949,451 A | 3/1934 | Brulatour | |
| 2,201,372 A * | 5/1940 | Miller | F16L 21/08 |
| | | | 277/619 |
| 2,980,449 A * | 4/1961 | Dunton | F16L 17/025 |
| | | | 277/615 |
| 3,425,717 A | 2/1969 | Bruce | |
| 4,054,306 A * | 10/1977 | Sadoff, Jr. | F16L 17/00 |
| | | | 285/233 |
| 5,160,179 A | 11/1992 | Takagi | |
| 5,553,895 A | 9/1996 | Karl et al. | |
| 5,722,702 A | 3/1998 | Washburn | |
| 5,769,460 A | 6/1998 | Imai | |
| 6,499,771 B1 | 12/2002 | Snyder, Sr. et al. | |
| 6,502,865 B1 | 1/2003 | Steele | |
| 6,663,145 B1 * | 12/2003 | Lyall, III | F16L 37/091 |
| | | | 285/104 |

(Continued)

FOREIGN PATENT DOCUMENTS

| | | |
|---|---|---|
| CA | 2532119 A1 * 1/2005 | ............ F16L 37/091 |
| DE | 2609576 A1 11/1976 | |

(Continued)

OTHER PUBLICATIONS

Arnco Corporation. Shur-Lock™ II Couplers. Product Bulletin, dated May 2006, 1 page.

(Continued)

*Primary Examiner* — Matthew Troutman
*Assistant Examiner* — James A Linford
(74) *Attorney, Agent, or Firm* — Craig R. Miles; CR Miles P.C.

(57) ABSTRACT

A coupler including a tubular conduit having a length disposed between a first end and a second end and a thickness disposed between an external surface and internal surface defining an interior passage, and a tubular guide, coupled to the first end, widening between the first end and a tubular guide terminal end of the tubular guide.

20 Claims, 13 Drawing Sheets

(56) References Cited

U.S. PATENT DOCUMENTS

| | | | |
|---|---|---|---|
| 6,719,330 | B2 | 4/2004 | Brown et al. |
| 6,805,383 | B2 | 10/2004 | Ostrander et al. |
| 6,851,446 | B2 | 2/2005 | van der Meijden et al. |
| 6,913,292 | B2 | 7/2005 | Snyder, Sr. et al. |
| 6,964,436 | B2 | 11/2005 | Le Quere |
| 7,121,593 | B2 | 10/2006 | Snyder, Sr. et al. |
| 7,344,166 | B2 | 3/2008 | Ketcham et al. |
| 7,467,813 | B2 | 12/2008 | Gunderson |
| 7,500,699 | B2 | 3/2009 | Snyder, Sr. et al. |
| 7,748,754 | B2 * | 7/2010 | Snijders ............... F16L 47/065 285/374 |
| 7,866,707 | B2 | 1/2011 | Sudar |
| 7,891,380 | B2 | 2/2011 | Gunderson |
| 7,914,051 | B2 | 3/2011 | Stoll et al. |
| 7,950,701 | B2 | 5/2011 | Dole et al. |
| 8,052,406 | B2 | 11/2011 | Li et al. |
| 8,091,932 | B2 | 1/2012 | Nijsen |
| 8,177,263 | B2 | 5/2012 | Dole et al. |
| 8,312,616 | B2 | 11/2012 | Dole et al. |
| 8,317,202 | B2 | 11/2012 | Rode et al. |
| 8,342,579 | B2 | 1/2013 | Hennemann et al. |
| 8,516,678 | B2 | 8/2013 | Hennemann et al. |
| 8,517,430 | B2 | 8/2013 | Dole et al. |
| 8,556,302 | B2 | 10/2013 | Dole |
| 8,607,431 | B2 | 12/2013 | Rode et al. |
| 8,662,557 | B2 | 3/2014 | Rode et al. |
| 8,801,048 | B2 | 8/2014 | Morris et al. |
| 8,814,219 | B2 | 8/2014 | Hennemann et al. |
| RE45,304 | E | 12/2014 | Dole et al. |
| 8,925,176 | B2 | 1/2015 | Choi et al. |
| 8,979,138 | B2 | 3/2015 | Dole et al. |
| 9,016,746 | B2 | 4/2015 | Rode et al. |
| D731,627 | S | 6/2015 | Guest |
| 9,121,535 | B2 | 9/2015 | Ammon et al. |
| 9,150,226 | B2 | 10/2015 | Rode et al. |
| D761,892 | S | 7/2016 | McCarty et al. |
| 9,388,922 | B2 | 7/2016 | Dole |
| 9,523,454 | B2 | 12/2016 | Schutte et al. |
| 9,568,127 | B2 | 2/2017 | Morris et al. |
| 2004/0239115 | A1 | 12/2004 | Wilk, Jr. et al. |
| 2005/0040650 | A1 | 2/2005 | Chang |
| 2005/0146133 | A1 | 7/2005 | Snyder, Sr. et al. |
| 2005/0173923 | A1 | 8/2005 | Ketcham et al. |
| 2006/0022454 | A1 | 2/2006 | Le Clinche et al. |
| 2006/0265852 | A1 | 11/2006 | Snyder, Sr. et al. |
| 2008/0111369 | A1 | 5/2008 | Pettinaroli |
| 2008/0185838 | A1 | 8/2008 | Sudar |
| 2008/0191481 | A1 | 8/2008 | Hartmann |
| 2008/0203723 | A1 | 8/2008 | Cellemme |
| 2009/0001712 | A1 | 1/2009 | Webb et al. |
| 2009/0032170 | A1 | 2/2009 | Williams |
| 2009/0194990 | A1 | 8/2009 | Williams |
| 2010/0194098 | A1 | 8/2010 | Hennemann et al. |
| 2010/0194104 | A1 | 8/2010 | Hennemann et al. |
| 2011/0214886 | A1 | 9/2011 | Orr |
| 2012/0211209 | A1 | 8/2012 | Choi et al. |
| 2013/0154260 | A1 | 6/2013 | Jamison et al. |
| 2015/0276099 | A1 | 10/2015 | Weissmann |
| 2015/0285420 | A1 * | 10/2015 | Stout .................... F16L 13/142 285/346 |

FOREIGN PATENT DOCUMENTS

| | | | |
|---|---|---|---|
| DE | 10335511 A1 | 10/2004 | |
| DE | 102007054025 A1 * | 5/2009 | ............ F16L 33/227 |
| DE | 202011101106 U1 * | 8/2012 | .......... F16L 33/2075 |
| EP | 241656 | 10/1987 | |
| EP | 2677225 A2 | 12/2013 | |
| EP | 3139076 A1 | 3/2017 | |
| FR | 2747453 A1 | 10/1997 | |
| FR | 2777341 A1 | 10/1999 | |
| FR | 3001023 A1 | 7/2014 | |
| GB | 1 372 241 A | 10/1974 | |
| JP | 54114821 A * | 9/1979 | |
| WO | 2008144332 A1 | 11/2008 | |
| WO | 2014144026 A2 | 9/2014 | |

OTHER PUBLICATIONS

U.S. Appl. No. 15/490,691, filed Apr. 18, 2017.
Daemar Inc. Self-Locking Retaining Rings. http://daemar.com, downloaded May 15, 2017, total 2 pages.
Traceparts. 3D models ANSI_ASME Inch _ Countersunk External Tooth-Lock Washers—Type B, https://www.tracepartsonline.net, downloaded May 15, 2017, total 2 pages.
PCT International Patent Application No. PCT/US18/26587; International Search Report and Written Opinion of the International Searching Authority dated Jul. 26, 2018, 27 pages.
U.S. Appl. No. 15/490,691; Office Action dated Feb. 19, 2019.
U.S. Appl. No. 15/490,691; Office Action dated Aug. 6, 2019.
U.S. Appl. No. 15/490,691; Office Action dated Jan. 7, 2020.
U.S. Appl. No. 15/490,691; Office Action dated Oct. 1, 2020.
European Patent Application No. 18787932.5; Extended European Search Report, dated Jan. 21, 2021, 10 pages.

* cited by examiner

COUPLER

This United States patent application is a continuation-in-part of U.S. patent application Ser. No. 15/490,691, filed Apr. 18, 2017, hereby incorporated by reference herein.

I. FIELD OF THE INVENTION

A coupler including a tubular conduit having a length disposed between a first end and a second end and a thickness disposed between an external surface and internal surface defining an interior passage, and a tubular guide, coupled to the first end, widening between the first end and a tubular guide terminal end.

II. SUMMARY OF THE INVENTION

Accordingly, a broad object of the invention can be to provide a coupler including one or more of: a tubular conduit having a length disposed between a conduit first end and a conduit second end and a conduit wall having a thickness disposed between an external surface and an internal surface defining an interior passage, and a tubular guide coupled to the tubular conduit first end and widening between the tubular conduit first end and a tubular guide terminal end.

Another broad object of the invention can be to provide a method of using a coupler including positioning a coupler in spatial relation to a pipe first end, the coupler including one or more of: a tubular conduit having a length disposed between a tubular conduit first end and a tubular conduit second end and a conduit wall having a thickness disposed between an external surface internal surface and an internal surface defining an interior passage, and a tubular guide coupled to the tubular conduit first end and widening between the tubular conduit first end and a tubular guide terminal end, and engaging a pipe first end to the tubular guide proximate the tubular guide terminal end, forcibly urging the pipe first end along the tubular guide, and guiding the pipe first end into the interior passage of the tubular conduit.

Naturally, further objects of the invention are disclosed throughout other areas of the specification, drawings, photographs, and claims.

III. BRIEF DESCRIPTION OF THE DRAWINGS

IV. DETAILED DESCRIPTION OF THE INVENTION

In general, a coupler including a tubular guide and a method of using a tubular guide of a coupler to guide a pipe first end into the interior passage of a tubular conduit of the coupler.

Figure 12:
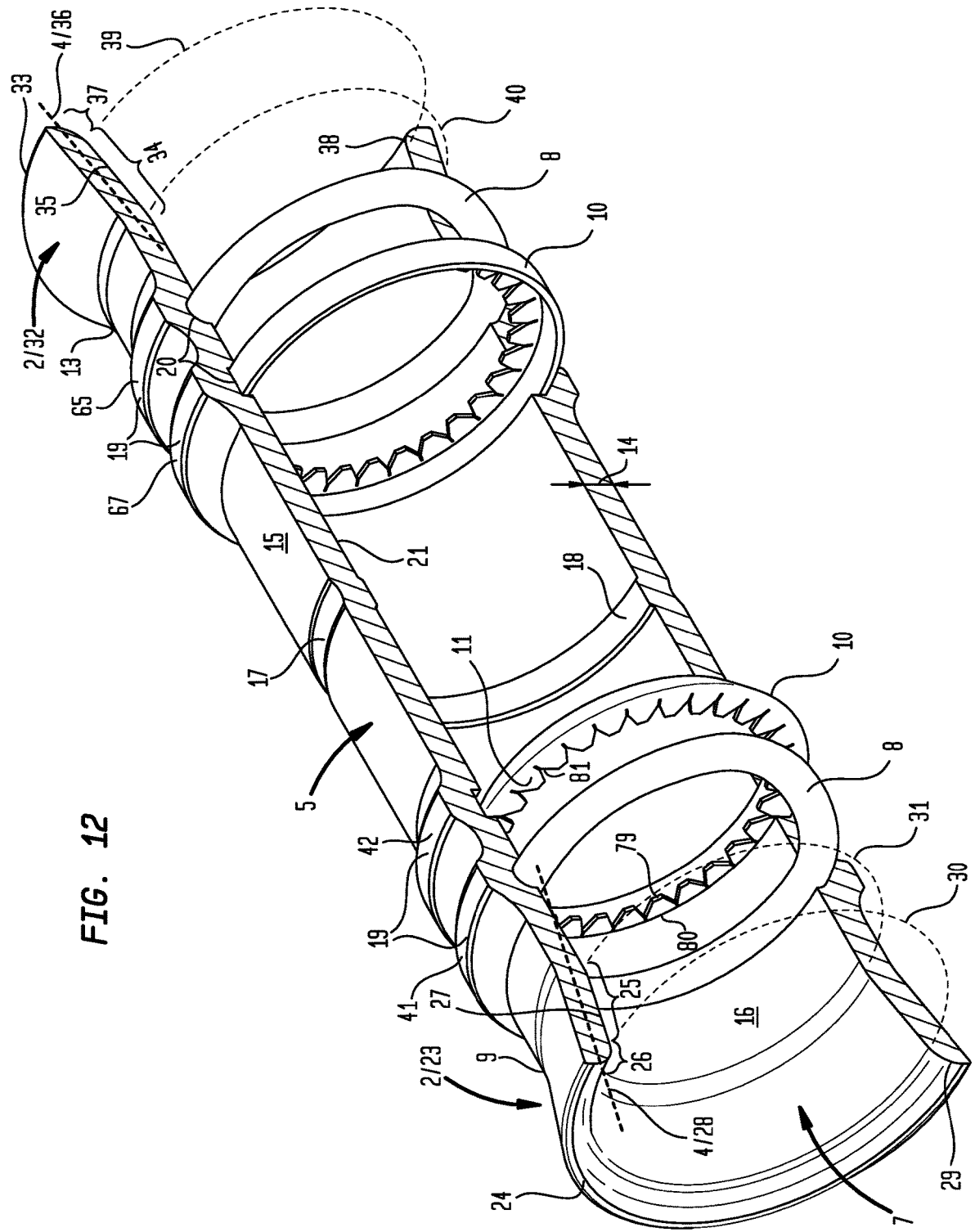
FIG. 12 is a perspective cross sectional view 12-12 of the particular embodiment of a coupler shown in FIG. 7 further including a seal element and an annular retaining member at each of the first end and the second end of the tubular conduit.
Figure 13:
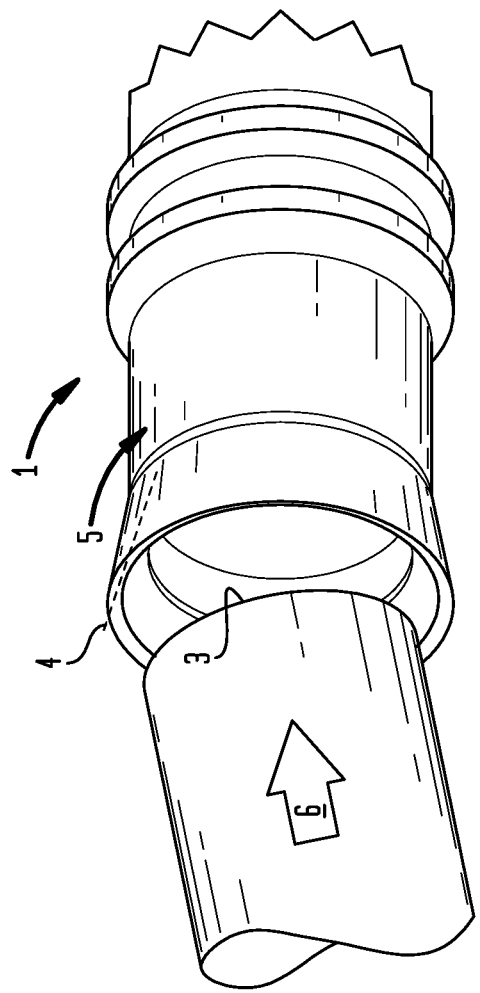
FIG. 13 illustrates a method of using a particular embodiment of a coupler in which a pipe first end engages a tubular guide of the couple to guide the pipe into the interior passage of the coupler.
Figure 14:
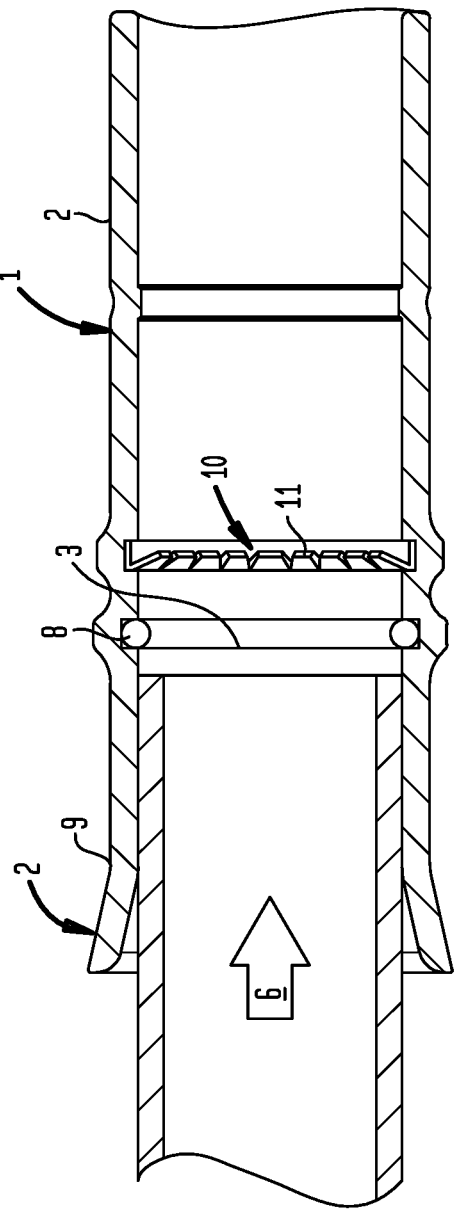
FIG. 14 is a cross section of a particular embodiment of a coupler having a pipe inserted into the interior passage of the coupler.

Generally referring to FIGS. 1 through 14, with specific reference to FIGS. 13 and 14, methods of using a coupler (1) including a tubular guide (2) can include positioning a coupler (1) in spatial relation to a pipe first end (3). The pipe first end (3) may be disposed in an angled relation to a longitudinal axis (4) of a tubular guide (2) coupled to a tubular conduit (5) of a coupler (1). The method can further include forcibly urging (6) the pipe first end (3) along the tubular guide (2), and guiding the pipe first end (3) into the interior passage (7) of the tubular conduit (5). In particular embodiments, the coupler (1) can, but need not necessarily include a seal element (8), and the pipe first end (3) can be slidingly inserted into the conduit first end (9) to sealably engage the seal element (8). In further particular embodiments, the coupler (1) can include an annular retaining member (10) having resiliently flexible tabs (11), whereupon the pipe first end (3) can be slidingly inserted into the conduit first end (9), sufficiently flexing the resiliently flexible tabs (11) of the annular retaining member (10) to allow passage through the annular retaining member (10). The resiliently flexible tabs (11) can forcibly engage the pipe first end (3) to prevent egress from the annular retaining member (10).

Generally referring to FIGS. 1 through 10, embodiments of a coupler (1) can include a tubular conduit (5) having a length (12) disposed between a conduit first end (9) and a conduit second end (13) and a thickness (14) disposed between an external surface (15) and an internal surface (16) of a conduit wall (21) defining an interior passage (7). Embodiments of a coupler (1) can further include one or more tubular guides (2). As to particular embodiments, the coupler can, but need not necessarily include, one or more external annular grooves (17) disposed in the external surface (15) overlaying an internal annular member (18) disposed on the internal surface (16), and one or more external annular members (19) disposed on the external surface (15) correspondingly overlaying one or more internal annular grooves (20) disposed in said internal surface (16).

The tubular conduit (5) can have a length (12) disposed between a first end (9) and a second end (13) of about 6.5 inches (165.1 millimeters) to about 8.5 inches (215.9 millimeters). In further particular embodiments, the length (12) of the tubular conduit (5) can be selected from the group including or consisting of: about 6.6 inches to about 6.8 inches, about 6.7 inches to about 6.9 inches, about 6.8 inches to about 7.0 inches, about 6.9 inches to about 7.1 inches, about 7.0 inches to about 7.2 inches, about 7.1 inches to about 7.3 inches, about 7.2 inches to about 7.4 inches, about 7.3 inches to about 7.5 inches, about 7.4 inches to about 7.6 inches, about 7.5 inches to about 7.7 inches, about 7.6 inches to about 7.8 inches, about 7.7 inches to about 7.9 inches, about 7.8 inches to about 8.0 inches, about 7.9 inches to about 8.1 inches, about 8.0 inches to about 8.2 inches, about 8.1 inches to about 8.3 inches, about 8.2 inches to about 8.4 inches, and combinations thereof. However, these examples are not intended to preclude embodiments have a greater or lesser length.

The tubular conduit (5) can include a conduit wall (21) having a thickness (14) disposed between an external surface (15) and an internal surface (16). The internal surface (16), external surface (15), or both can have the same or different surface roughnesses or surface finishes. The internal surface (16) of the tubular conduit (5) can define an interior passage (7) communicating between the first and second ends (9)(13). In particular embodiments, as shown in the examples of FIGS. 4, 5, 9, and 10, the tubular conduit (5) can, but need not necessarily, have a generally cylindrical internal surface (16). The thickness (14) of the conduit wall (21) can be about 0.15 inches (3.81 millimeters) to about 0.35 inches (8.89 millimeters). In further particular embodiments, the thickness (14) of the conduit wall (11) can be selected from the group including or consisting of about 0.16 inches to about 0.2 inches, about 0.175 inches to about 0.225 inches, about 0.2 inches to about 0.25 inches, about 0.225 inches to about 0.275 inches, about 0.25 inches to about 0.3 inches, about 0.275 inches to about 0.325 inches, about 0.3 inches to about 0.34 inches, and combinations thereof. However, these examples are not intended to preclude embodiments having a conduit wall (21) of greater or lesser thickness.

The interior passage (7) can have a diameter (22) of about 0.5 inch (12.7 millimeters) to about 4.5 inches (114.3 millimeters). In further particular embodiments, the diameter (22) can be selected from the group including or consisting of: about 0.75 inches to about 1 1.25 inches, about 1.0 inches to about 1.5 inches, about 1.25 inches to about 1.75 inches, about 1.5 inches to about 2.0 inches, about 1.75 inches to about 2.25 inches, about 2.0 inches to about 2.5 inches, about 2.25 inches to about 2.75 inches, about 2.5 inches to about 3.0 inches, about 2.75 inches to about 3.25 inches, about 3.0 inches to about 3.50 inches, about 3.25 inches to about 3.75 inches, about 3.5 inches to about 4.0 inches, about 3.75 inches to about 4.25 inches, and combinations thereof. However, these examples are not intended to preclude embodiments having a greater or lesser diameter (22).

The tubular conduit (5) can be produced from wide variety of substantially rigid materials compatible with a fluid intended to be contained or flow through the interior passage (7). In particular embodiments, the tubular conduit can be produced from a material selected from the group including or consisting of: a metal, copper, concrete, a plastic, a polyvinyl chloride, acrylonitrile butadiene styrene, polyethylene, and combinations thereof.

Now referring to FIGS. 1 through 10, particular embodiments of a coupler (1) can include one or more tubular guides (2). A first tubular guide (23) can be coupled to the conduit first end (9). The first tubular guide (23) can widen between the conduit first end (9) and a first tubular guide terminal end (24). Now referring primarily to FIG. 3A the first tubular guide (23) can have a first tubular guide length (12A) disposed between the tubular conduit first end (9) and the first tubular guide terminal end (24) of between about 0.5 inches to about 1 inch. However, this illustrative range is not intended to preclude embodiments have a greater or lesser length.

The first tubular guide (2) can further include a first tubular guide first region (25) and a first tubular guide second region (26). The first tubular guide first region (25) can be disposed proximate the conduit first end (9). The first tubular guide first region (25) can further have a first radius of curvature (27) along the longitudinal axis (28) of the first tubular guide (2). The first tubular guide second region (26) can be disposed adjacent the first tubular guide region (25) and extend toward the first tubular guide terminal end (24). The first tubular guide second region (26) can have a second radius of curvature (29) along the longitudinal axis (28) of the first tubular guide (2). In particular embodiments, the second radius of curvature (29) can be less than the first radius of curvature (27).

In particular embodiments, the first tubular guide first region (25) can have a first radius of curvature (27) of about 0.450 inches (11.43 millimeters) to about 0.700 inches (17.78 millimeters). In further embodiments, the first radius of curvature (27) can be selected from the group consisting of: about 0.460 inches to about 0.500 inches, about 0.475 inches to about 0.525 inches, about 0.500 inches to about 0.550 inches, about 0.525 inches to about 0.575 inches, about 0.550 inches to about 0.600 inches, about 0.575 inches to about 0.625 inches, about 0.600 inches to about 0.650 inches, about 0.625 inches to about 0.675 inches, about 0.650 inches to about 0.690 inches, and combinations thereof. However, these examples a first radius of curvature (27) are not intended to preclude embodiments having a greater or lesser first radius of curvature (27).

In particular embodiments, the first tubular guide second region (26) can have a second radius of curvature (29) of about 0.150 inches (3.81 millimeters) to about 0.450 inches (11.43 millimeters). In further embodiments, the second radius of curvature (29) can be selected from the group consisting of: about 0.160 inches to about 0.200 inches, about 0.175 inches to about 0.225 inches, about 0.200 inches to about 0.250 inches, about 0.225 inches to about 0.275 inches, about 0.250 inches to about 0.300 inches, about 0.275 inches to about 0.325 inches, about 0.300 inches to about 0.350 inches, about 0.325 inches to about 0.375 inches, about 0.350 inches to about 0.400 inches, about 0.375 inches to about 0.425 inches, about 0.400 inches to about 0.440 inches, and combinations thereof. However, these examples a second radius of curvature (29) are not intended to preclude embodiments having a greater or lesser second radius of curvature (29).

In particular embodiments, the ratio of the cross-section area (30) of the tubular guide (2) at the first tubular guide terminal end (24) orthogonal to the longitudinal axis of the tubular conduit (1) to the cross-section area (31) of the tubular guide (2) at the conduit first end (9) orthogonal to the longitudinal axis of the tubular conduit (1) can have a first ratio of about 1:0.75 to about 1:0.95. In further embodiments, the first ratio can be selected from the group consisting of: about 1:0.76 to about 1:0.77, about 1:0.765 to about 1:0.775, about 1:0.77 to about 1:0.78, about 1:0.775 to about 1:0.785, about 1:0.78 to about 1:0.79, about 1:0.785 to about 1:0.795, about 1:0.79 to about 1:0.80, about 1:0.795 to about 1:0.805, about 1:0.80 to about 1:0.81, about 1:0.805 to about 1:0.815, about 1:0.81 to about 1:0.82, about 1:0.815 to about 1:0.825, about 1:0.82 to about 1:0.83, about 1:0.825 to about 1:0.835, about 1:0.83 to about 1:0.84, about 1:0.835 to about 1:0.845, about 1:0.84 to about 1:0.85, about 1:0.845 to about 1:0.855, about 1:0.85 to about 1:0.86, about 1:0.855 to about 1:0.865, about 1:0.86 to about 1:0.87, about 1:0.865 to about 1:0.875, about 1:0.87 to about 1:0.88, about 1:0.875 to about 1:0.885, about 1:0.88 to about 1:0.89, about 1:0.885 to about 1:0.895, about 1:0.89 to about 1:0.90, about 1:0.895 to about 1:0.905, about 1:0.90 to about 1:0.91, about 1:0.905 to about 1:0.915, about 1:0.91 to about 1:0.92, about 1:0.915 to about 1:0.925, about 1:0.92 to about 1:0.93, about 1:0.925 to about 1:0.935, about 1:0.93 to about 1:0.94, and combinations thereof. However, these examples a first ratio are not intended to preclude embodiments having a greater or lesser first ratio.

Particular embodiments of a coupler (1) can further include a second tubular guide (32) coupled to the conduit second end (13). The second tubular guide (32) can widen between the conduit second end (13) and a second tubular guide terminal end (33). The second tubular guide (32) can include a second tubular guide first region (34) proximate the conduit second end (13). The second tubular guide first region (34) can have a first radius of curvature (35) along the longitudinal axis (36) of the second tubular guide (32). The second tubular guide (32) can further have a second tubular guide second region (37) disposed adjacent to the second tubular guide first region (34) and extending toward the second tubular guide terminal end (33). The second tubular guide second region (37) can have a second radius of curvature (38) along the longitudinal axis (36) of the second tubular guide (2). In particular embodiments, the second radius of curvature (38) of the second tubular guide second region can be less than the first radius of curvature (35) of the second tubular guide first region (34).

In particular embodiments, the second tubular guide first region (34) can have a first radius of curvature (35) of about 0.450 inches (11.43 millimeters) to about 0.700 inches (17.78 millimeters). In further embodiments, the first radius of curvature (35) of the second tubular guide first region (34) can be selected from the group consisting of: about 0.460 inches to about 0.500 inches, about 0.475 inches to about 0.525 inches, about 0.500 inches to about 0.550 inches, about 0.525 inches to about 0.575 inches, about 0.550 inches to about 0.600 inches, about 0.575 inches to about 0.625 inches, about 0.600 inches to about 0.650 inches, about 0.625 inches to about 0.675 inches, about 0.650 inches to about 0.690 inches, and combinations thereof.

In particular embodiments, the second tubular guide second region (37) can have a fourth radius of curvature (38) of about 0.150 inches (3.81 millimeters) to about 0.450 inches (11.43 millimeters). In further embodiments, the fourth radius of curvature (38) can be selected from the group consisting of: about 0.160 inches to about 0.200 inches, about 0.175 inches to about 0.225 inches, about 0.200 inches to about 0.250 inches, about 0.225 inches to about 0.275 inches, about 0.250 inches to about 0.300 inches, about 0.275 inches to about 0.325 inches, about 0.300 inches to about 0.350 inches, about 0.325 inches to about 0.375 inches, about 0.350 inches to about 0.400 inches, about 0.375 inches to about 0.425 inches, about 0.400 inches to about 0.440 inches, and combinations thereof.

In particular embodiments, the ratio of a cross-section area (39) of the second tubular guide (32) at the second tubular guide terminal end (33) orthogonal to the longitudinal axis of the tubular conduit (1) to a cross-section area (40) of said second tubular guide (2) at the conduit second end (13) orthogonal to the longitudinal axis of the tubular conduit (1) can have a second ratio of about 1:0.75 to about 1:0.95. In further embodiments, the second ratio can be selected from the group consisting of: about 1:0.76 to about 1:0.77, about 1:0.765 to about 1:0.775, about 1:0.77 to about 1:0.78, about 1:0.775 to about 1:0.785, about 1:0.78 to about 1:0.79, about 1:0.785 to about 1:0.795, about 1:0.79 to about 1:0.80, about 1:0.795 to about 1:0.805, about 1:0.80 to about 1:0.81, about 1:0.805 to about 1:0.815, about 1:0.81 to about 1:0.82, about 1:0.815 to about 1:0.825, about 1:0.82 to about 1:0.83, about 1:0.825 to about 1:0.835, about 1:0.83 to about 1:0.84, about 1:0.835 to about 1:0.845, about 1:0.84 to about 1:0.85, about 1:0.845 to about 1:0.855, about 1:0.85 to about 1:0.86, about 1:0.855 to about 1:0.865, about 1:0.86 to about 1:0.87, about 1:0.865 to about 1:0.875, about 1:0.87 to about 1:0.88, about 1:0.875 to about 1:0.885, about 1:0.88 to about 1:0.89, about 1:0.885 to about 1:0.895, about 1:0.89 to about 1:0.90, about 1:0.895 to about 1:0.905, about 1:0.90 to about 1:0.91, about 1:0.905 to about 1:0.915, about 1:0.91 to about 1:0.92, about 1:0.915 to about 1:0.925, about 1:0.92 to about 1:0.93, about 1:0.925 to about 1:0.935, about 1:0.93 to about 1:0.94, and combinations thereof. However, these examples a second ratio are not intended to preclude embodiments having a greater or lesser second ratio.

Now referring primarily to FIG. 8A the second tubular guide (32) can have a second tubular guide length (12B) disposed between the tubular conduit second end (13) and the second tubular guide terminal end (33) of between about 0.5 inches to about 1 inch. However, this illustrative range is not intended to preclude embodiments have a greater or lesser length.

Now referring to FIGS. 1 through 5, particular embodiments of a coupler (1) can, but need not necessarily, include a first external annular member (41) circumferentially disposed on the external surface (15). As to particular embodiments, a second external annular member (42) can be circumferentially disposed on the external surface (15) of the tubular conduit (5). In particular embodiments, the first external annular member (41) can overlay a first internal annular groove (43) circumferentially disposed in the internal surface (16) of the tubular conduit (5). As to particular embodiments, a first and second external annular member (41)(42) can correspondingly overlay a first and second internal annular groove (43)(44) circumferentially disposed in axial spaced apart relation on the internal surface (16) of the tubular conduit (5). In particular embodiments, the first external annular member (41) overlaying the first internal annular groove (43) and the second external annular member (42) overlaying the second internal annular groove (44) can further be disposed in axial spaced apart relation on the external surface (15) of the tubular conduit (5) proximate the first end (9). In further particular embodiments, the first external annular member (41) overlaying the first internal annular groove (43) can be disposed a lesser distance from the first end (9) than the second external annular member (42) overlaying the second internal annular groove (44).

In particular embodiments, each of the first and second external annular members (41)(42) can be configured to have a crown (45) extending outward from the external surface (15). Each side (46) of a respective crown (45) of the first and second external annular members (41)(42) can, but need not necessarily, taper towards the external surface (15), where the width (47) of the crown (45) can be substantially equal to a width (48) of the corresponding first or second internal annular grooves (43)(44). In other particular embodiments, each side (46) of a respective crown (45) of the first and second external annular members (41)(42) can, but need not necessarily, be orthogonal to the external surface (15). The height (49) of the crown (45) of the first and second external annular members (41)(42) can be between about 1.0 times and about 2.0 times that of the depth (50) of the corresponding first and second internal annular grooves (43)(44).

In particular embodiments, each of the first and second internal annular grooves (43)(44) can, but need not necessarily, be configured to have two sides (51) orthogonal to the bottom (52) of each of the respective first and second internal annular grooves (43)(44), as exemplified in FIGS. 3A and 8A. In further particular embodiments, each of the first and second internal annular grooves (43)(44) can, but need not necessarily be configured as a single arcuate bottom (53) disposed between the edges (54) of the respective first and second internal annular grooves (20), as exemplified in FIGS. 3B and 8B.

In further particular embodiments of a coupler (1), an external annular groove (17) can be circumferentially disposed on the external surface (15) of the tubular conduit (5) and overlay an internal annular member (18) circumferentially disposed on the internal surface (16) of the tubular conduit (5). The external annular groove (17) can, but need not necessarily, be configured to have two sides (55) orthogonal to a bottom (56) of the external annular groove (17), as exemplified in FIGS. 3C and 8C. In further particular embodiments, the external annular groove (17) can, but need not necessarily, be configured as a single arcuate bottom (57) disposed between the edges (58) of the external annular groove (17), as exemplified in FIGS. 3A and 8A. In particular embodiments, the internal annular member (18) can be configured to have a crown (59) extending outward from the internal surface (16) into the interior passage (7). Each side (60) of the crown (59) can, but need not necessarily, taper towards the internal surface (16) where the width (61) of the crown (59) can be substantially equal to the width (62) of the external annular groove (17). In other particular embodiments, each side (60) of the crown (59) of the internal annular member (18) can, but need not necessarily, be orthogonal to the internal surface (16). The height (63) of the crown (59) of the internal annular member (18) can be between about 1.0 times and about 2.0 times that of the depth (64) of the external annular groove (17). The external annular groove (17) overlaying the internal annular member (18) can further, but need not necessarily, be disposed proximate the second end (13) of the tubular conduit (5).

The internal surface (16) of the tubular conduit (5), in particular embodiments, can further be configured to taper as the internal surface (16) approaches the first internal annular groove (43) from the first end (9) of the tubular conduit (5). The internal surface (16) can taper about 0.01 inches (0.254 millimeters) to about 0.03 inches (0.762 millimeters) between the first end (9) and the first internal annular groove (43). In further particular embodiments, the taper of the internal surface (16) between the first end (9) and the first internal annular groove (43) can be selected from the group including or consisting of: about 0.012 inches to about 0.014 inches, about 0.013 inches to about 0.015 inches, about 0.014 inches to about 0.016 inches, about 0.015 inches to about 0.017 inches, about 0.016 inches to about 0.018 inches, about 0.017 inches to about 0.019 inches, about 0.018 inches to about 0.020 inches, about 0.019 inches to about 0.021 inches, about 0.020 inches to about 0.022 inches, about 0.021 inches to about 0.023 inches, about 0.022 inches to about 0.024 inches, about 0.023 inches to about 0.025 inches, about 0.024 inches to about 0.026 inches, about 0.025 inches to about 0.027 inches, about 0.026 inches to about 0.028 inches, about 0.027 inches to about 0.029 inches, and combinations thereof.

Referring generally to FIGS. 6 through 10, particular embodiments of a coupler (1) can further include a third external annular member (65) circumferentially disposed on the external surface (15) of the tubular conduit (5) and overlaying a third internal annular groove (66) circumferentially disposed in the internal surface (16) of the tubular conduit (5). Additionally, a fourth external annular member (67) can be circumferentially disposed on the external surface (15) of the tubular conduit (5) and overlaying a fourth internal annular groove (68) circumferentially disposed in the internal surface (16) of the tubular conduit (5). The third and fourth external annular members (65)(67) correspondingly overlaying the third and fourth internal annular grooves (66)(68) can be disposed in axial spaced apart relation on the external surface (15) of the tubular conduit (5) proximate the second end (13). The third external annular member (65) overlaying the third internal annular groove (66) can be disposed a lesser distance from the second end (13) than the fourth external annular member (67) overlaying the fourth internal annular groove (68). In particular embodiments, the external annular groove (17) overlaying the internal annular member (18) can be medially disposed on the tubular conduit (5).

In particular embodiments, each of the third and fourth external annular members (65)(67) can have a crown (69) extending outward from the external surface (15). Each side (70) of a respective crown (69) of the third and fourth external annular members (65)(67) can, but need not necessarily, taper towards the external surface (15), where the width (71) of the crown (69) can be substantially equal to a width (72) of the corresponding third and fourth internal annular groove (66)(68). In other particular embodiments, each side (70) of a respective crown (69) of the third and fourth external annular members (65)(67) can, but need not necessarily, be orthogonal to the external surface (15). The height (73) of the crown (69) of the third and fourth external annular members (65)(67) can be between about 1.0 times and about 2.0 times that of the depth (74) of the corresponding third and fourth internal annular grooves (66)(68).

In particular embodiments, each of the third and fourth internal annular grooves (66)(68) can, but need not necessarily, have two sides (75) orthogonally joined to the bottom (76) of each of the respective third and fourth internal annular grooves (66)(68), as exemplified in FIG. 8A. In further particular embodiments, each of the third and fourth internal grooves (66)(68) can, but need not necessarily be configured as a single arcuate bottom (77) disposed between the edges (78) of the respective third and fourth internal grooves (66)(68), as exemplified in FIG. 8D.

In particular embodiments, the first internal annular groove (43), the second internal annular groove (44), the third internal annular groove (66), the fourth annular groove (68), and the external annular groove (17) can each have a depth (64)(74) of about 0.1 inches (2.54 millimeters) to about 0.3 inches (7.62 millimeters). In further particular embodiments, the depth (64)(74) of the first internal annular groove (43), the second internal annular groove (44), the third internal annular groove (66), the fourth internal annular groove (68), and the external annular groove (17) can be selected from the group including or consisting of: about 0.12 inches to about 0.14 inches, about 0.13 inches to about 0.15 inches, about 0.14 inches to about 0.16 inches, about 0.15 inches to about 0.17 inches, about 0.16 inches to about 0.18 inches, about 0.17 inches to about 0.19 inches, about 0.18 inches to about 0.2 inches, about 0.19 inches to about 0.21 inches, about 0.2 inches to about 0.22 inches, about 0.21 inches to about 0.23 inches, about 0.22 inches to about 0.24 inches, about 0.23 inches to about 0.25 inches, about 0.24 inches to about 0.26 inches, about 0.25 inches to about 0.27 inches, about 0.26 inches to about 0.28 inches, about 0.27 inches to about 0.29 inches, and combinations thereof.

Figure 1:
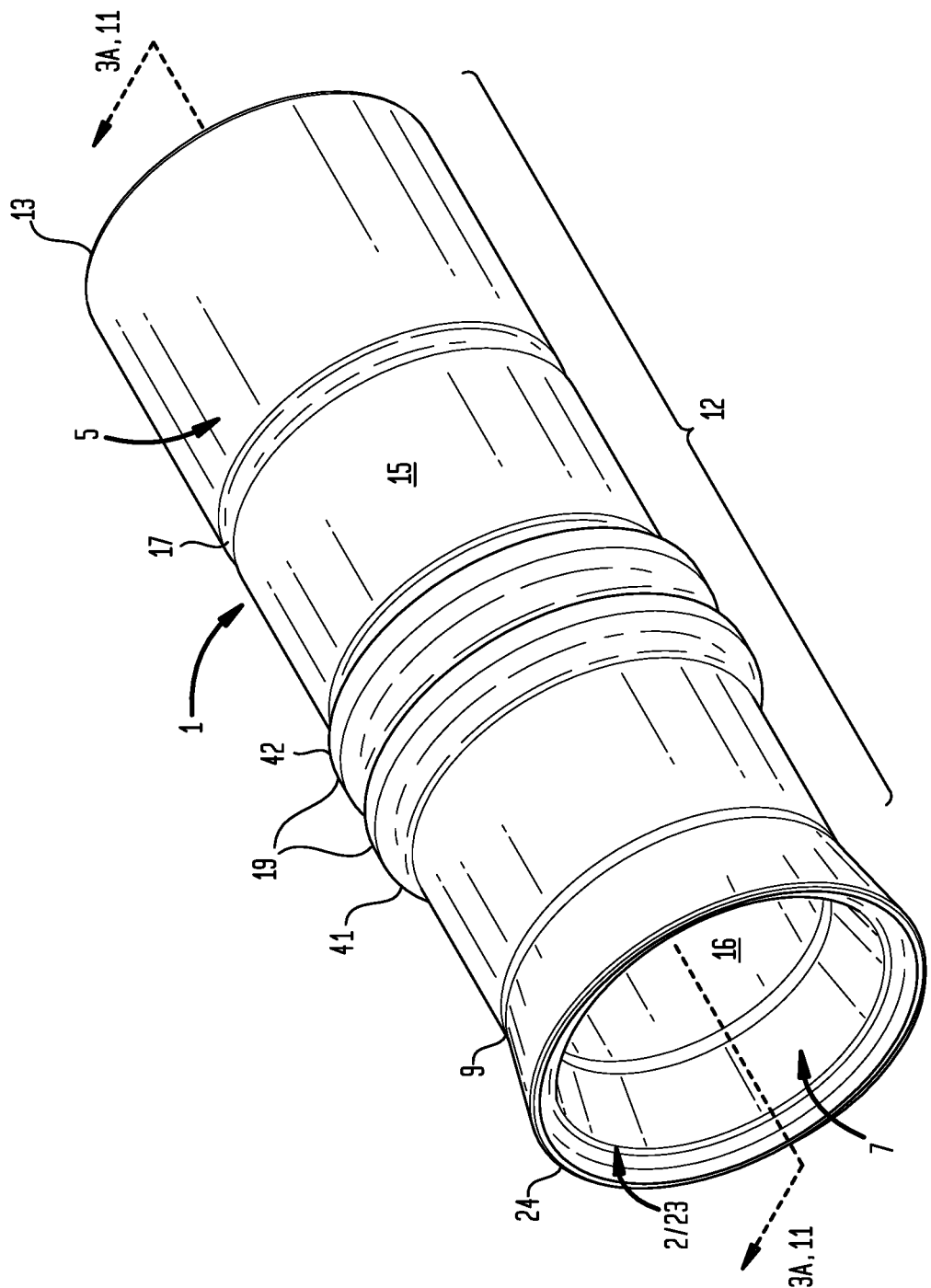
FIG. 1 is a perspective view of a particular embodiment of a coupler.
Figure 2:
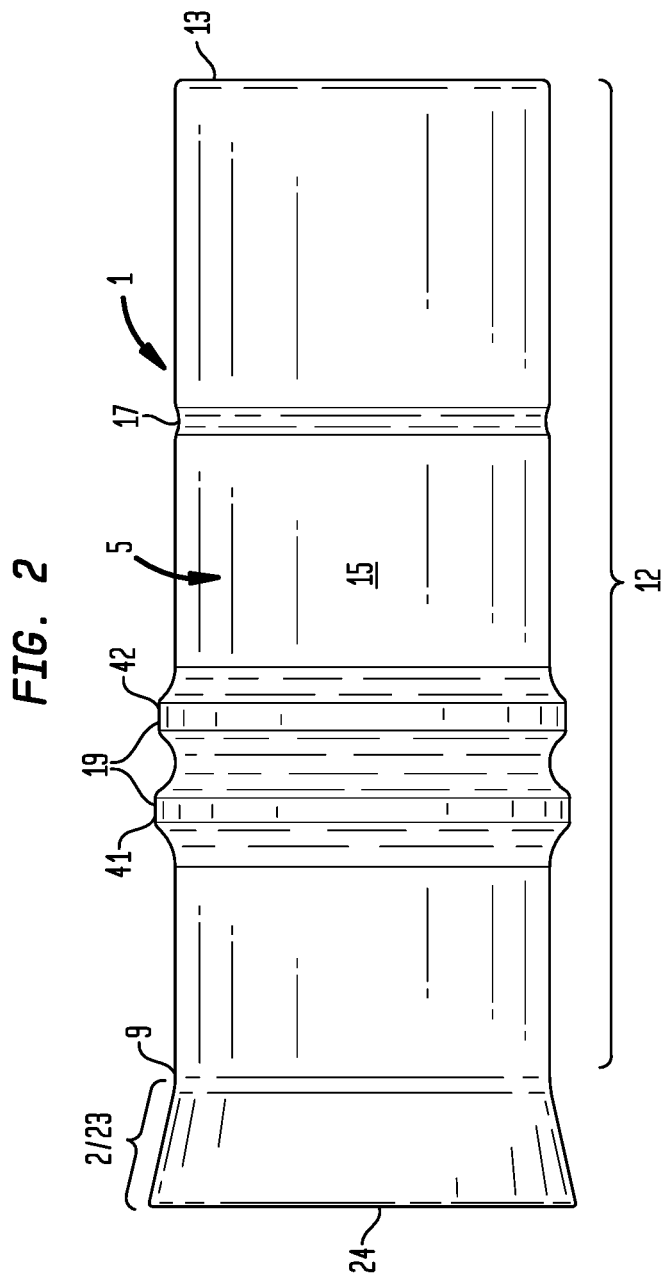
FIG. 2 is a side view of a particular embodiment of a coupler.
Figure 3:
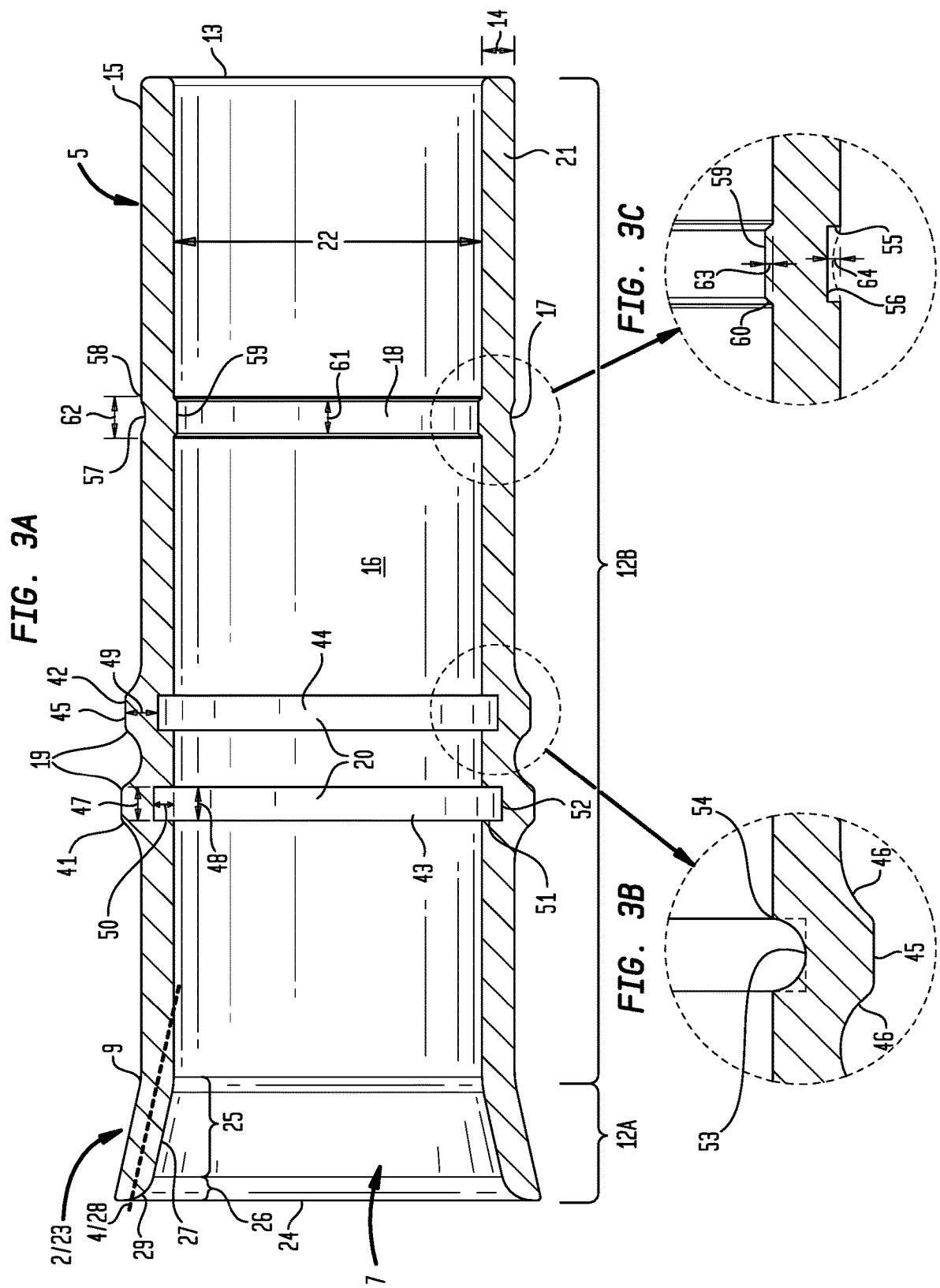
FIG. 3A is a cross sectional view 3A-3A of the particular embodiment of the coupler shown in FIG. 1.
FIG. 3B is an enlarged portion of the cross sectional view 3A-3A.
FIG. 3C is another enlarged portion of the cross sectional view 3A-3A.
Figure 4:
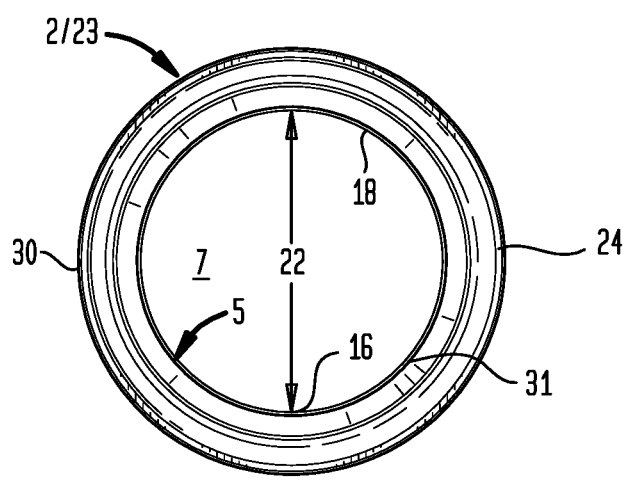
FIG. 4 is a first end view of a particular embodiment of a coupler.
Figure 5:
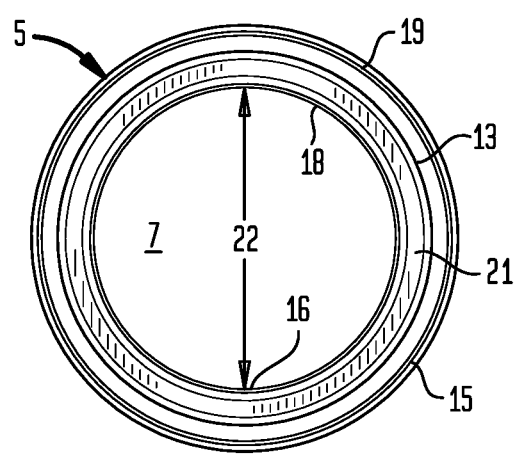
FIG. 5 is a second end view of a particular embodiment of a coupler.
Figure 6:
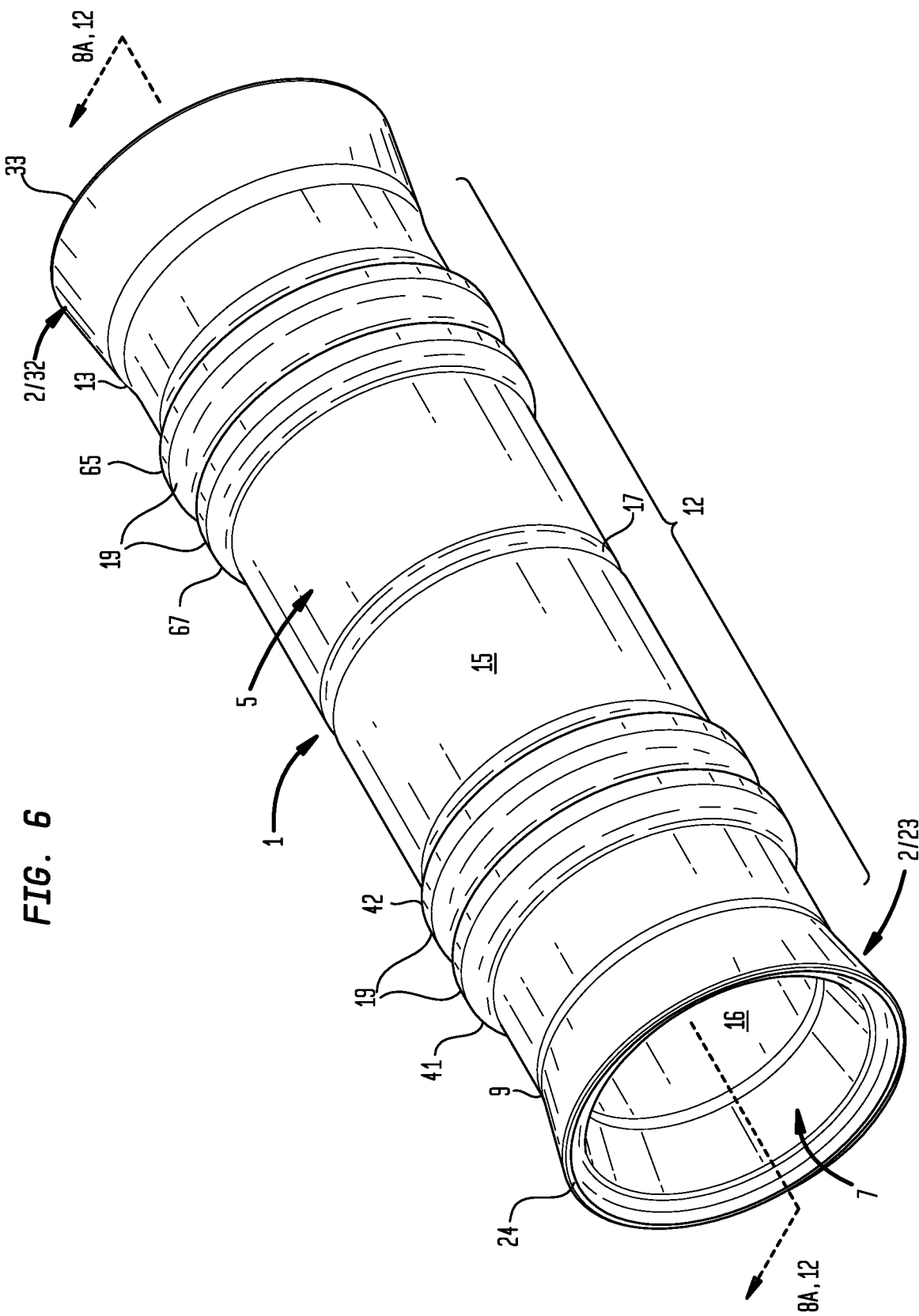
FIG. 6 is a perspective of a particular embodiment of a coupler.
Figure 7:
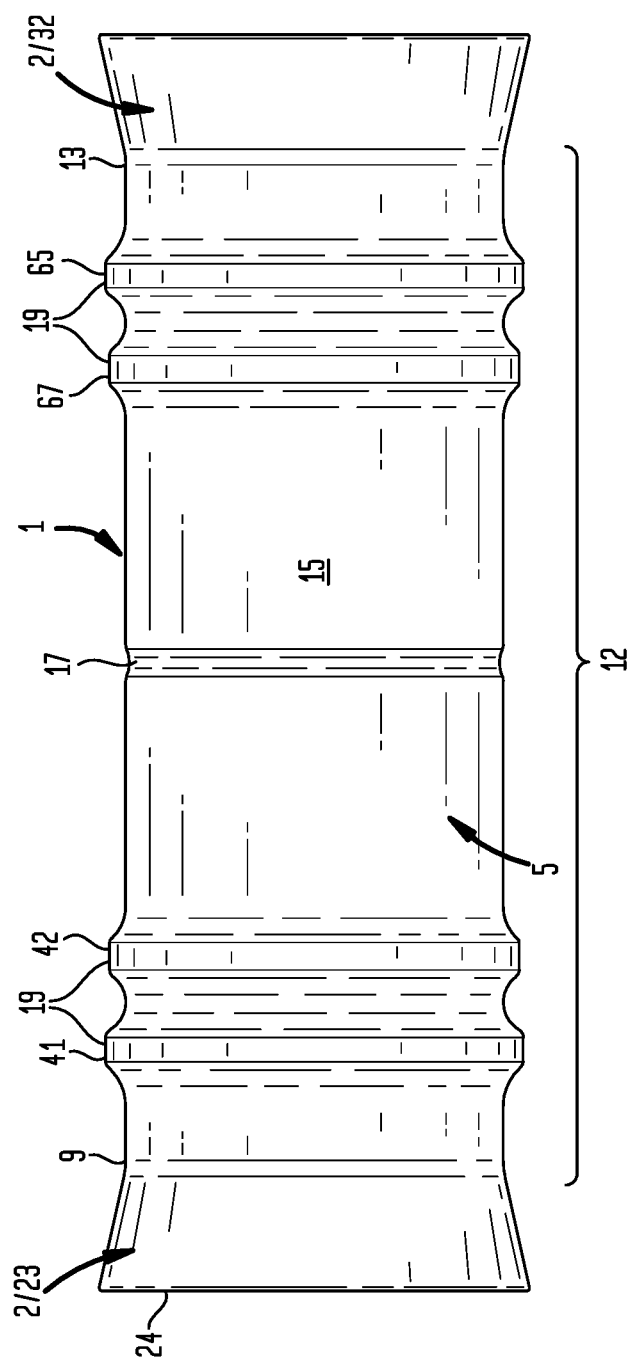
FIG. 7 is a side view of a particular embodiment of a coupler.
Figure 8:
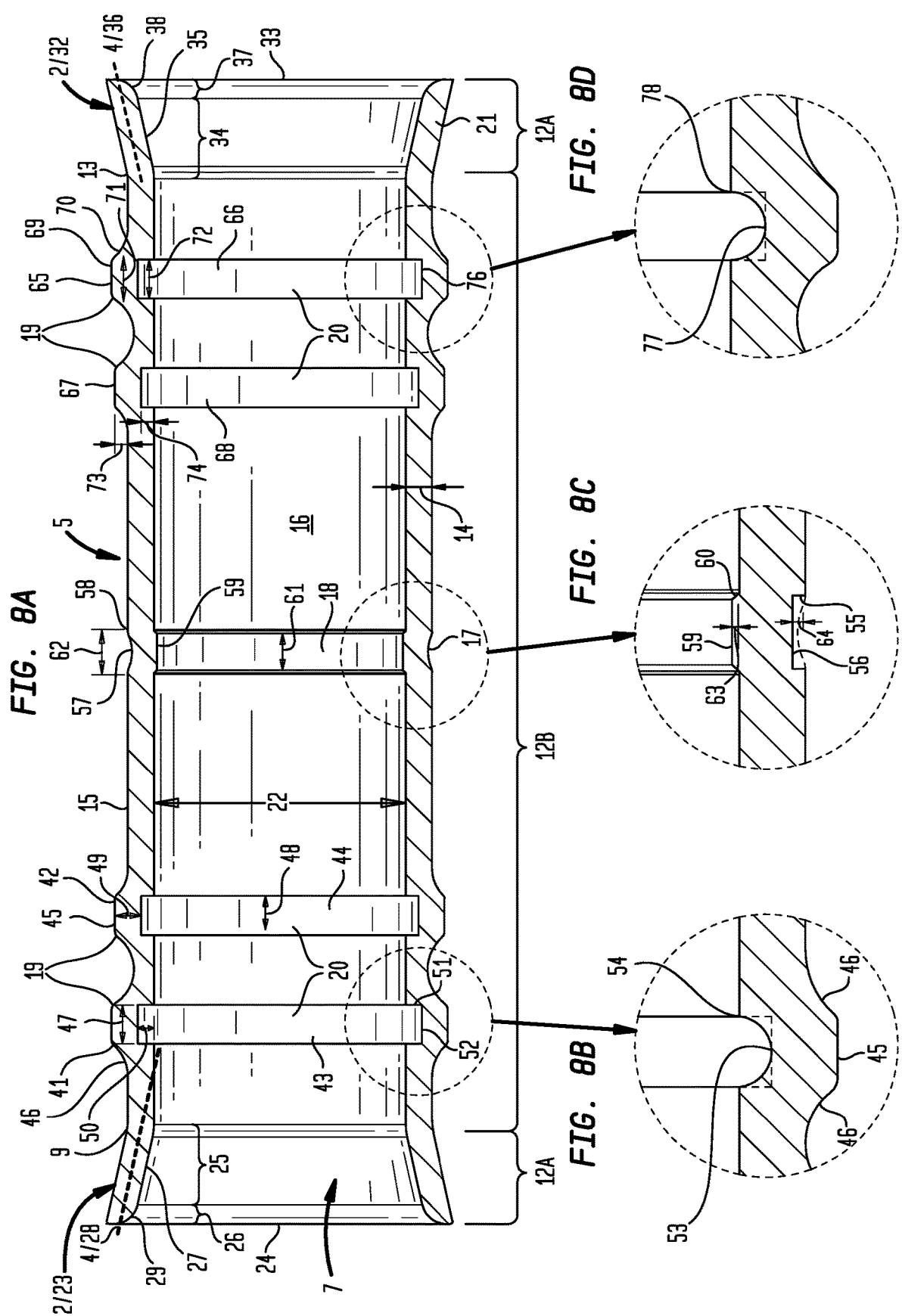
FIG. 8A is a cross sectional view 8A-8A of the particular embodiment of the coupler shown in FIG. 6.
FIG. 8B is an enlarged portion of the cross sectional view 8A-8A.
FIG. 8C is an enlarged portion of the cross sectional view 8A-8A.
FIG. 8D is an enlarged portion of the cross sectional view 8A-8A.
Figure 9:
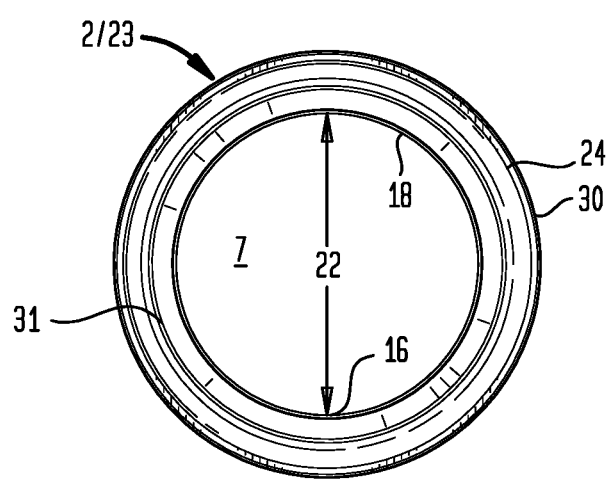
FIG. 9 is a first end view of a particular embodiment of a coupler.
Figure 10:
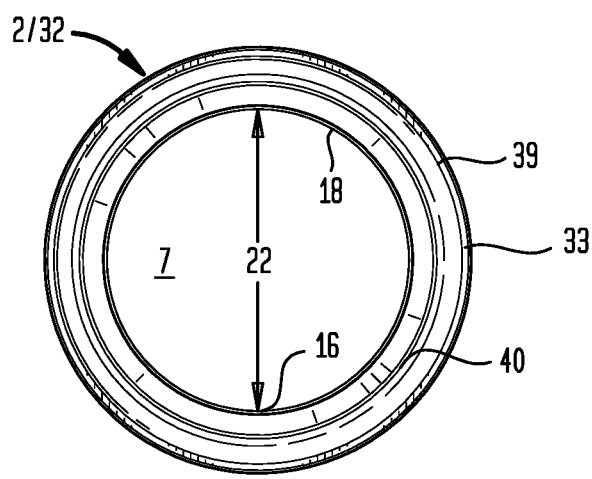
FIG. 10 is a second end view of a particular embodiment of a coupler.
Figure 11:
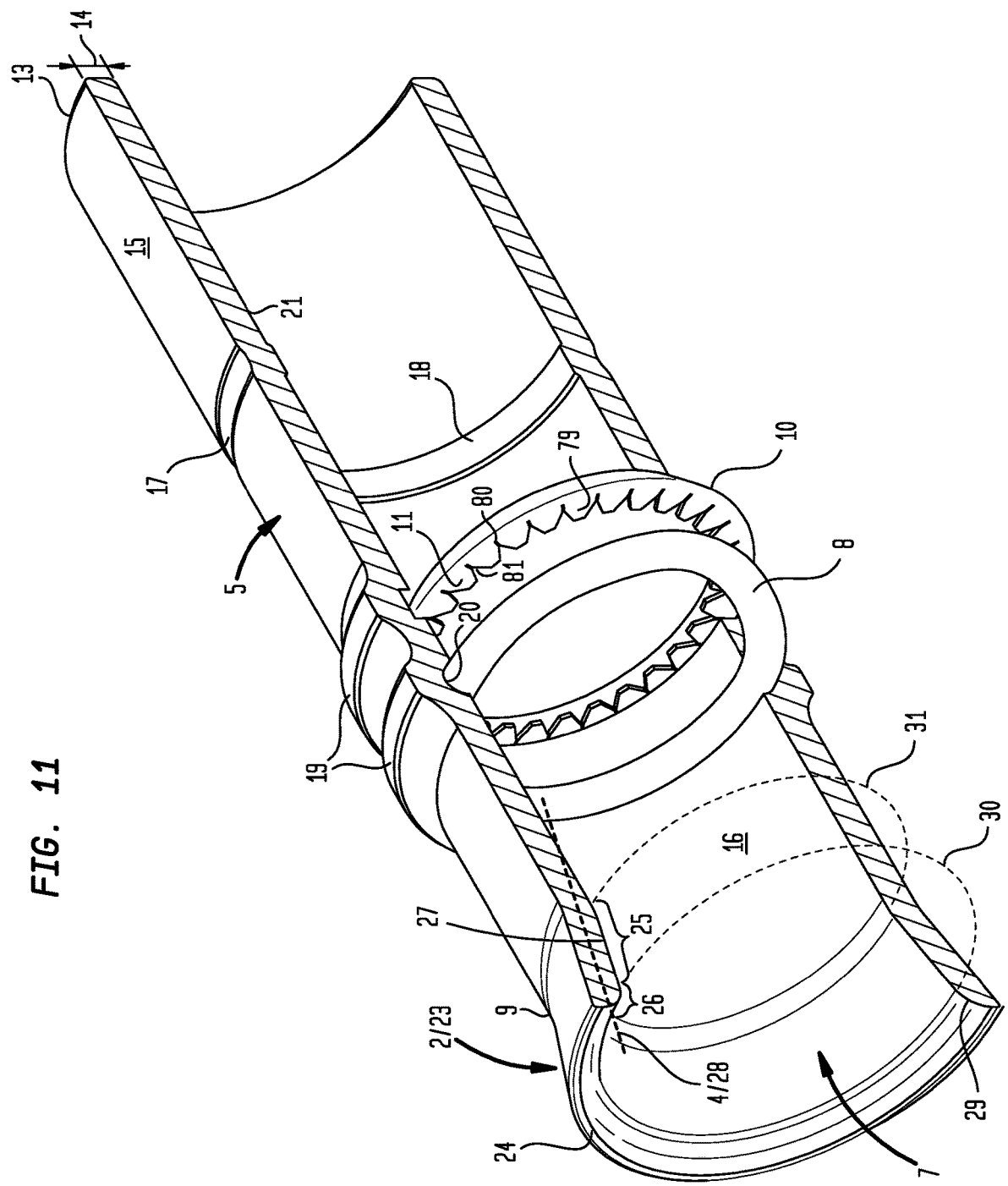
FIG. 11 is a perspective cross sectional view 11-11 of the particular embodiment of the coupler shown in FIG. 1 further including a seal element and an annular retaining member.

Now referring to FIGS. 11 and 12, particular embodiments of the coupler (1) can include a seal element (8) disposed in the first internal annular groove (43). The seal element (8) can be configured to have a portion of the seal element (8) extending outward of the internal surface (16) into the interior passage (7). While the seal element shown in FIGS. 11 and 12 have a circular cross-sectional width; this is not intended to preclude particular embodiments of the seal element having other configurations of the cross-sectional width such as square, rectangular, or oval cross-sectional widths. The seal element (8) can be produced from a material selected from the group including or consisting of: ethylene propylene diene monomer, silicone, fluorocarbon, fluorosilicone, polyurethane, tetrafluoroethylene/propylene, nitrile, and neoprene, or combinations thereof.

Particular embodiments of the coupler (1) can further have an annular retaining member (10). The annular retaining member (10) can have an outer periphery (79) and an inner periphery (80). A plurality of slots (81) can be disposed in circumferentially spaced apart relation about the inner periphery (80) and radially extend from the inner periphery (80) toward the outer periphery (79) to define a plurality of tabs (11). As to particular embodiments the plurality of tabs (11) can be a plurality of resiliently flexible tabs. As to particular embodiments each of the plurality of tabs (11) can taper toward the inner periphery (as shown in the examples of FIGS. 11 and 12). The outer periphery (79) can be disposed in the second internal annular groove (44). The annular retaining member (10) can be produced from a material selected from the group including or consisting of rust-resistant metal, coated metal, metal, rigid plastics, coated rigid plastics, or combinations thereof.

As can be easily understood from the foregoing, the basic concepts of the present invention may be embodied in a variety of ways. The invention involves numerous and varied embodiments of a coupler and methods for making and using such couplers including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "coupler" should be understood to encompass disclosure of the act of "coupling"—whether explicitly discussed or not—and, conversely, were there effectively disclosure of the act of "coupling", such a disclosure should be understood to encompass disclosure of a "coupler" and even a "means for coupling." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the couplers herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

What is claimed is:

1. A coupler, comprising:
a tubular conduit having a length disposed between a conduit first end and a conduit second end and a conduit wall having a thickness disposed between an external surface and an internal surface, said internal surface defining an interior passage between said conduit first end and said conduit second end; and
a first tubular guide extending circumferentially and axially along said conduit internal surface which flares outwardly in relation to a central longitudinal axis of said tubular conduit to said conduit first end,
said first tubular guide maintaining a substantially uniform thickness circumferentially and axially between said external surface and said internal surface of said tubular conduit,
said first tubular guide having a first region and a second region along said conduit internal surface,
said first region extending along the entire circumference and axially along said conduit internal surface in a first continuous concave curvature;
said second region adjoining said first region and extending along the entire circumference and axially along said conduit internal surface in a second continuous concave curvature terminating in said conduit first end,
said first continuous concave curvature of said first region having lesser concave curvature than said second continuous concave curvature of said second region.

2. The coupler of claim 1, wherein said first tubular guide first region has said first radius of curvature of about 0.450 inches (11.43 millimeters) to about 0.700 inches (17.78 millimeters).

3. The coupler of claim 2, wherein said first radius of curvature is selected from the group consisting of: about 0.460 inches to about 0.500 inches, about 0.475 inches to about 0.525 inches, about 0.500 inches to about 0.550 inches, about 0.525 inches to about 0.575 inches, about 0.550 inches to about 0.600 inches, about 0.575 inches to about 0.625 inches, about 0.600 inches to about 0.650 inches, about 0.625 inches to about 0.675 inches, about 0.650 inches to about 0.690 inches, and combinations thereof.

4. The coupler of claim 2, wherein said first tubular guide second region has said second radius of curvature of about 0.150 inches (3.81 millimeters) to about 0.450 inches (11.43 millimeters).

5. The coupler of claim 4, wherein said second radius of curvature is selected from the group consisting of: about 0.160 inches to about 0.200 inches, about 0.175 inches to about 0.225 inches, about 0.200 inches to about 0.250 inches, about 0.225 inches to about 0.275 inches, about 0.250 inches to about 0.300 inches, about 0.275 inches to about 0.325 inches, about 0.300 inches to about 0.350 inches, about 0.325 inches to about 0.375 inches, about 0.350 inches to about 0.400 inches, about 0.375 inches to about 0.425 inches, about 0.400 inches to about 0.440 inches, and combinations thereof.

6. The coupler of claim 1, wherein a ratio of a cross-section area of said first tubular guide at said conduit first end orthogonal to said central longitudinal axis of said tubular conduit to a cross-section area of said tubular guide adjoining said tubular conduit orthogonal to said longitudinal axis of said tubular conduit comprises about 1:0.75 to about 1:0.95.

7. The coupler of claim 6, wherein said ratio is selected from the group consisting of: about 1:0.76 to about 1:0.77, about 1:0.765 to about 1:0.775, about 1:0.77 to about 1:0.78, about 1:0.775 to about 1:0.785, about 1:0.78 to about 1:0.79, about 1:0.785 to about 1:0.795, about 1:0.79 to about 1:0.80, about 1:0.795 to about 1:0.805, about 1:0.80 to about 1:0.81, about 1:0.805 to about 1:0.815, about 1:0.81 to about 1:0.82, about 1:0.815 to about 1:0.825, about 1:0.82 to about 1:0.83, about 1:0.825 to about 1:0.835, about 1:0.83 to about 1:0.84, about 1:0.835 to about 1:0.845, about 1:0.84 to about 1:0.85, about 1:0.845 to about 1:0.855, about 1:0.85 to about 1:0.86, about 1:0.855 to about 1:0.865, about 1:0.86 to about 1:0.87, about 1:0.865 to about 1:0.875, about 1:0.87 to about 1:0.88, about 1:0.875 to about 1:0.885, about 1:0.88 to about 1:0.89, about 1:0.885 to about 1:0.895, about 1:0.89 to about 1:0.90, about 1:0.895 to about 1:0.905, about 1:0.90 to about 1:0.91, about 1:0.905 to about 1:0.915, about 1:0.91 to about 1:0.92, about 1:0.915 to about 1:0.925, about 1:0.92 to about 1:0.93, about 1:0.925 to about 1:0.935, about 1:0.93 to about 1:0.94, and combinations thereof.

8. The coupler of claim 1, further comprising a first external annular member circumferentially disposed on said external surface, said first external annular member overlaying a first internal annular groove circumferentially disposed on said internal surface of said tubular conduit.

9. The coupler of claim 8, further comprising an external annular groove circumferentially disposed on said external surface of said tubular conduit, said external annular groove overlaying an internal annular member circumferentially disposed on said internal surface of said tubular conduit.

10. The coupler of claim 9, further comprising a second external annular member circumferentially disposed on said external surface of said tubular conduit overlaying a second internal annular groove circumferentially disposed on said internal surface of said tubular conduit.

11. The coupler of claim 10, wherein said first external annular member overlaying said first annular groove and said second external annular member overlaying said second internal annular groove disposed in axial spaced apart relation on said external surface of said tubular conduit proximate said first end, said first external annular member overlaying said first internal annular groove disposed a lesser distance from said first end than said second external annular member overlaying said second internal annular groove, said external annular groove overlaying said internal annular member disposed proximate said second end.

12. The coupler of claim 11, wherein each of said first and second external annular members include a substantially flat crown disposed between a pair of sides which taper towards said external surface, wherein said substantially flat crown and said internal annular groove have substantially equal width, wherein said crown has a height of between about 1.0 times and about 2.0 times that of a depth of said internal annular groove.

13. The coupler of claim 12, wherein said first internal annular groove, said second internal annular groove, and said external annular groove each having a depth of about 0.1 inches (2.54 millimeters) to about 0.3 inches (7.62 millimeters).

14. The coupler of claim 13, further comprising a seal element disposed in said first internal annular groove, wherein a portion of said seal element extending outward of said internal surface into said interior passage.

15. The coupler of claim 14, further comprising an annular retaining member having an outer periphery and an inner periphery, said inner periphery having a plurality of radially extending slots in circumferentially spaced apart relation about said inner periphery defining a plurality of resiliently flexible tabs, said outer periphery disposed in said second internal annular groove.

16. The coupler of claim 1, wherein said length of said tubular conduit is between about 6.5 (165.1 millimeters) inches to about 8.5 inches (215.9 millimeters).

17. The coupler of claim 16, wherein said tubular conduit is produced from a material selected from the group consisting of: metal, copper, concrete, polyvinyl chloride, acrylonitrile butadiene styrene, polyethylene, and combinations thereof.

18. The coupler of claim 16, wherein said tubular conduit has a generally cylindrical internal surface.

19. The coupler of claim 18, wherein said cylindrical internal surface has a diameter of about 0.5 inches (12.7 millimeters) to about 4.5 inches (114.3 millimeters).

20. The coupler of claim 1, further comprising:
a second tubular guide extending circumferentially and axially along said conduit internal surface to flare outwardly in relation to a central longitudinal axis of said tubular conduit to said conduit second end,
said second tubular guide maintaining a substantially uniform thickness circumferentially and axially between said external surface and said internal surface of said tubular conduit,
said second tubular guide having a first region and a second region along said conduit internal surface,
said first region extending along the entire circumference and axially along said conduit internal surface in a first continuous concave curvature;
said second region adjoining said first region and extending along the entire circumference and axially along said conduit internal surface in a second continuous concave curvature terminating in said conduit second end,
said first continuous concave curvature of said first region having lesser concave curvature than said second continuous concave curvature of said second region.

* * * * *